US009400193B2

(12) United States Patent
Whitson, Jr.

(10) Patent No.: US 9,400,193 B2
(45) Date of Patent: *Jul. 26, 2016

(54) DEVICE, AND ASSOCIATED METHOD, FOR COMMUNICATION

(71) Applicant: Ovie V. Whitson, Jr., Shady Shores, TX (US)

(72) Inventor: Ovie V. Whitson, Jr., Shady Shores, TX (US)

(73) Assignee: Aclara Technologies, LLC, Hazelwood, MO (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/217,046

(22) Filed: Mar. 17, 2014

(65) Prior Publication Data

US 2014/0292531 A1 Oct. 2, 2014

Related U.S. Application Data

(63) Continuation-in-part of application No. 13/407,595, filed on Feb. 28, 2012, now abandoned, which is a continuation of application No. 12/105,258, filed on Apr. 17, 2008, now Pat. No. 8,126,665, which is a continuation-in-part of application No. 11/092,287, filed on Mar. 28, 2005, now abandoned.

(60) Provisional application No. 61/798,957, filed on Mar. 15, 2013, provisional application No. 60/556,619, filed on Mar. 26, 2004.

(51) Int. Cl.
*G01D 4/00* (2006.01)
*H04W 84/12* (2009.01)
*H04L 29/08* (2006.01)
*H04M 11/00* (2006.01)
*H04Q 9/00* (2006.01)

(52) U.S. Cl.
CPC ............... *G01D 4/002* (2013.01); *G01D 4/004* (2013.01); *H04L 67/12* (2013.01); *H04W 84/12* (2013.01); *H04M 11/002* (2013.01); *H04Q 9/00* (2013.01); *H04Q 2209/60* (2013.01); *Y02B 90/241* (2013.01); *Y04S 20/32* (2013.01)

(58) Field of Classification Search
None
See application file for complete search history.

(56) References Cited

U.S. PATENT DOCUMENTS 5,388,101 A 2/1995 Dinkins
5,481,546 A 1/1996 Dinkins
(Continued)

FOREIGN PATENT DOCUMENTS

WO 0174045 A1 10/2001

*Primary Examiner* — Mohamed Barakat
(74) *Attorney, Agent, or Firm* — Jack D. Stone, Jr.; Scheef & Stone, L.L.P.

(57) ABSTRACT

An antenna is adapted for receiving via a CDMA/1×RTT digital wireless cellular radio communications network incoming data from a client remote control station, and for transmitting via a wireless cellular communications network outgoing data to the client remote control station. A cellular modem is connected to the antenna for establishing a wireless telephony data connection, and a processor is connected to the modem for receiving and processing incoming data, and for processing and communicating outgoing data to the modem for transmission via the antenna and the wireless cellular communications network to the client remote control station. A communication interface, such as a WiFi hotspot, is connected to the processor and connectable to the meter for communicating incoming data from the processor to the meter, and for communicating the outgoing data from the meter to the processor. A power supply is connected for supplying power to the processor and the modem.

16 Claims, 10 Drawing Sheets

(56) References Cited

U.S. PATENT DOCUMENTS

| | | | |
|---|---|---|---|
| 5,592,491 A | 1/1997 | Dinkins | |
| 6,150,955 A * | 11/2000 | Tracy et al. | 340/870.02 |
| 6,181,294 B1 | 1/2001 | Porter et al. | |
| 6,300,881 B1 * | 10/2001 | Yee et al. | 340/870.02 |
| 6,333,975 B1 | 12/2001 | Brunn et al. | |
| 6,462,713 B2 | 10/2002 | Porter et al. | |
| 6,577,245 B2 | 6/2003 | Hammond | |
| 6,650,249 B2 | 11/2003 | Meyer et al. | |
| 6,671,586 B2 | 12/2003 | Davis et al. | |
| 6,710,721 B1 | 3/2004 | Holowick | |
| 6,778,099 B1 | 8/2004 | Meyer et al. | |
| 6,798,352 B2 | 9/2004 | Holowick | |
| 6,819,226 B2 | 11/2004 | Randall | |
| 6,836,737 B2 | 12/2004 | Petite et al. | |
| 6,862,498 B2 | 3/2005 | Davis et al. | |
| 6,903,699 B2 | 6/2005 | Porter et al. | |
| 6,946,972 B2 | 9/2005 | Mueller et al. | |
| 7,009,379 B2 | 3/2006 | Ramirez | |
| 7,027,808 B2 | 4/2006 | Wesby | |
| 7,209,840 B2 | 4/2007 | Petite et al. | |
| 7,248,181 B2 | 7/2007 | Patterson et al. | |
| 7,250,874 B2 | 7/2007 | Mueller et al. | |
| 7,289,887 B2 | 10/2007 | Rodgers | |
| 7,315,257 B2 | 1/2008 | Patterson et al. | |
| 7,346,463 B2 | 3/2008 | Petite et al. | |
| 7,349,766 B2 | 3/2008 | Rodgers | |
| 7,451,019 B2 | 11/2008 | Rodgers | |
| 7,734,380 B2 | 6/2010 | Ransom et al. | |
| 7,738,999 B2 | 6/2010 | Petite | |
| 7,765,035 B2 | 7/2010 | Rodgers | |
| 7,994,990 B2 | 8/2011 | Stoufer et al. | |
| 8,005,576 B2 | 8/2011 | Rodgers | |
| 8,010,640 B2 | 8/2011 | Aune et al. | |
| 8,049,470 B2 | 11/2011 | Khan | |
| 8,082,068 B2 | 12/2011 | Rodgers | |
| 8,103,390 B2 | 1/2012 | Rodgers | |
| 8,116,917 B2 | 2/2012 | Rodgers | |
| 8,126,665 B1 | 2/2012 | Whitson | |
| 8,127,628 B2 | 3/2012 | Barna et al. | |
| 8,188,884 B2 | 5/2012 | Randall et al. | |
| 8,274,401 B2 | 9/2012 | Rudolf et al. | |
| 9,001,698 B2 * | 4/2015 | Edwards | 370/256 |
| 2002/0118119 A1 | 8/2002 | Hammond | |
| 2004/0128085 A1 | 7/2004 | Ramirez | |
| 2004/0138835 A1 * | 7/2004 | Ransom et al. | 702/62 |
| 2005/0222933 A1 | 10/2005 | Wesby | |
| 2008/0084878 A1 | 4/2008 | Akbar et al. | |
| 2008/0106241 A1 * | 5/2008 | Deaver et al. | 323/209 |
| 2008/0150753 A1 | 6/2008 | Rudolf et al. | |
| 2008/0238701 A1 * | 10/2008 | Bickel et al. | 340/635 |
| 2009/0129133 A1 | 5/2009 | Khan | |
| 2010/0200732 A1 | 8/2010 | Barna et al. | |
| 2010/0200735 A1 | 8/2010 | Barna et al. | |
| 2010/0201514 A1 | 8/2010 | Barna et al. | |
| 2011/0149544 A1 | 6/2011 | Khan | |
| 2011/0235368 A1 | 9/2011 | Khan | |
| 2011/0248685 A1 | 10/2011 | Khan | |
| 2011/0273307 A1 | 11/2011 | Aune et al. | |
| 2011/0273308 A1 | 11/2011 | Aune et al. | |
| 2012/0038328 A1 | 2/2012 | Khan | |
| 2012/0050000 A1 | 3/2012 | Melvin, Jr. et al. | |
| 2012/0050040 A1 | 3/2012 | Melvin, Jr. et al. | |
| 2012/0050971 A1 | 3/2012 | Seal et al. | |
| 2012/0054397 A1 | 3/2012 | Melvin, Jr. et al. | |
| 2012/0054398 A1 | 3/2012 | Melvin, Jr. et al. | |
| 2012/0054540 A1 | 3/2012 | Howard et al. | |
| 2012/0054571 A1 | 3/2012 | Howard et al. | |
| 2012/0054712 A1 | 3/2012 | Melvin, Jr. et al. | |
| 2012/0054852 A1 | 3/2012 | Gibbs et al. | |
| 2012/0098710 A1 | 4/2012 | Seal et al. | |
| 2012/0154228 A1 | 6/2012 | Stoufer et al. | |
| 2012/0293383 A1 | 11/2012 | Randall et al. | |

* cited by examiner

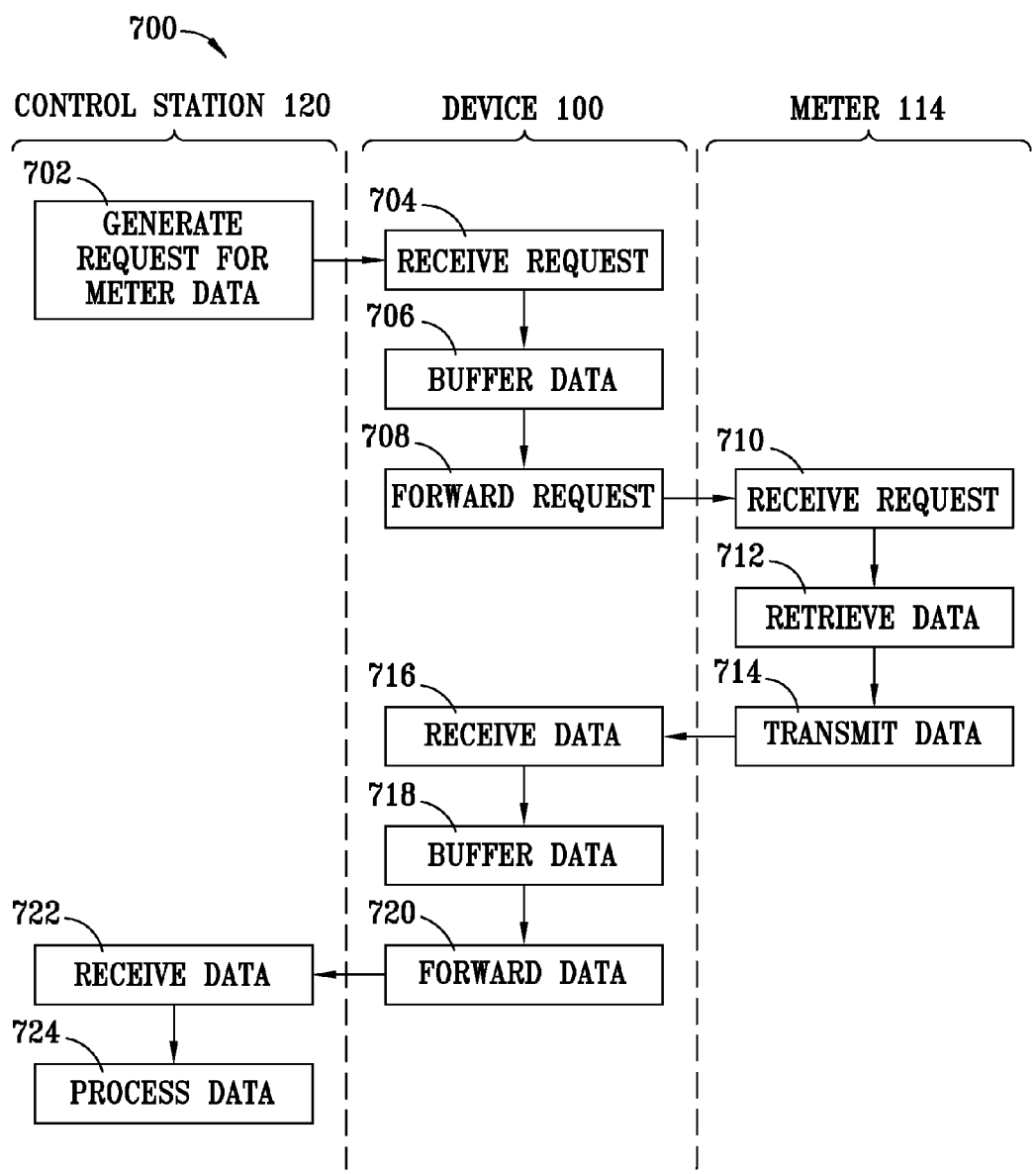

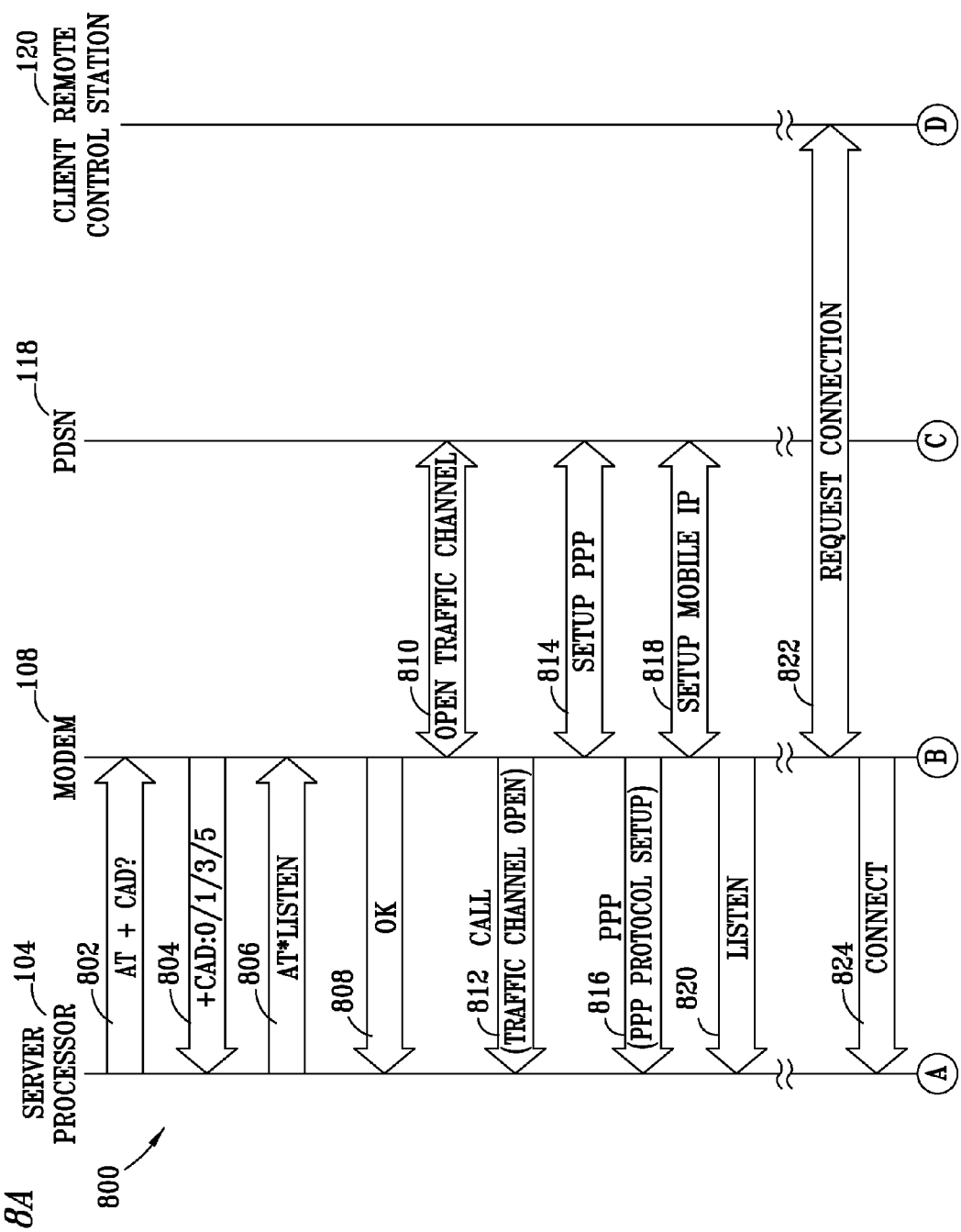

DEVICE, AND ASSOCIATED METHOD, FOR COMMUNICATION

CROSS-REFERENCE TO RELATED APPLICATIONS

This application is a continuation-in-part application of prior application Ser. No. 13/407,595, filed Feb. 28, 2012, which is a continuation of U.S. Pat. No. 8,126,665, formerly co-pending patent application Ser. No. 12/105,258, filed on Apr. 17, 2008, and issued on Feb. 28, 2012, which is a continuation-in-part of prior application Ser. No. 11/092,287, filed Mar. 28, 2005; this application claims the benefit of U.S. Provisional Application No. 61/798,957, filed Mar. 15, 2013, and application Ser. No. 11/092,287 claims the benefit of U.S. Provisional Patent Application No. 60/556,619, filed on Mar. 26, 2004, all of which applications are incorporated by reference herein in their entirety.

TECHNICAL FIELD

The invention relates generally to two way communications for monitoring and receiving data from a meter and, more particularly, to a device and method for facilitating wireless digital cellular remote data communications for monitoring utility meters, such as electric meters, gas meters, and water meters, as well as automatic teller machines (ATM's), remote terminal units (RTUs), end point devices, and the like.

BACKGROUND

Utility meters are commonly used to measure a quantity of electricity, water, or gas utilized by consumers. These measured and calculated quantities generated by the meter are collected by a utility company and used for billing purposes, system analysis, troubleshooting and, in some cases, are provided to the customer for internal management and optimization of processes.

If the meters are located in hard-to-reach areas, restricted areas, or if the need for more frequent access to data exists, then it is preferable for the meters to be monitored remotely, and for data generated from a meter reading to be electronically acquired and transmitted to where it is needed. Such acquisition and transmissions may be effectuated via a wireline transmission, if a wireline is available, or may be set up for such transmission.

If a wireline transmission is not available or it is not feasible to set one up, then it is desirable to be able to transmit meter reading data via a wireless link. However, many conventional meters are not capable of wireless communication.

Therefore, what is needed is an apparatus and method for facilitating wireless communication and acquisition of meter reading data from conventional electric meters.

SUMMARY

The present invention, accordingly, provides an apparatus for wirelessly monitoring a meter, wherein an antenna is adapted for receiving via a CDMA/1×RTT digital wireless cellular radio communications network incoming data from a remote control station, and for transmitting via a wireless cellular communications network outgoing data to the remote control station. A cellular modem is connected to the antenna for establishing a wireless telephony data connection, and a processor is connected to the modem for receiving and processing incoming data, and for processing and communicating outgoing data to the modem for transmission via the antenna and the wireless cellular communications network to the remote component. A Wifi communication interface is connected to the processor and connectable to the meter for communicating incoming data from the processor to the meter, and for communicating the outgoing data from the meter to the processor. A power supply is connected for supplying power to the processor and the modem.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 depicts a flow chart exemplifying control logic for retrieving data from the meter through the device of FIG. 1;

FIGS. 8A-8B depict a flow chart exemplifying control logic for server operation while the modem is in a Listen mode.

DETAILED DESCRIPTION

Figure 1:
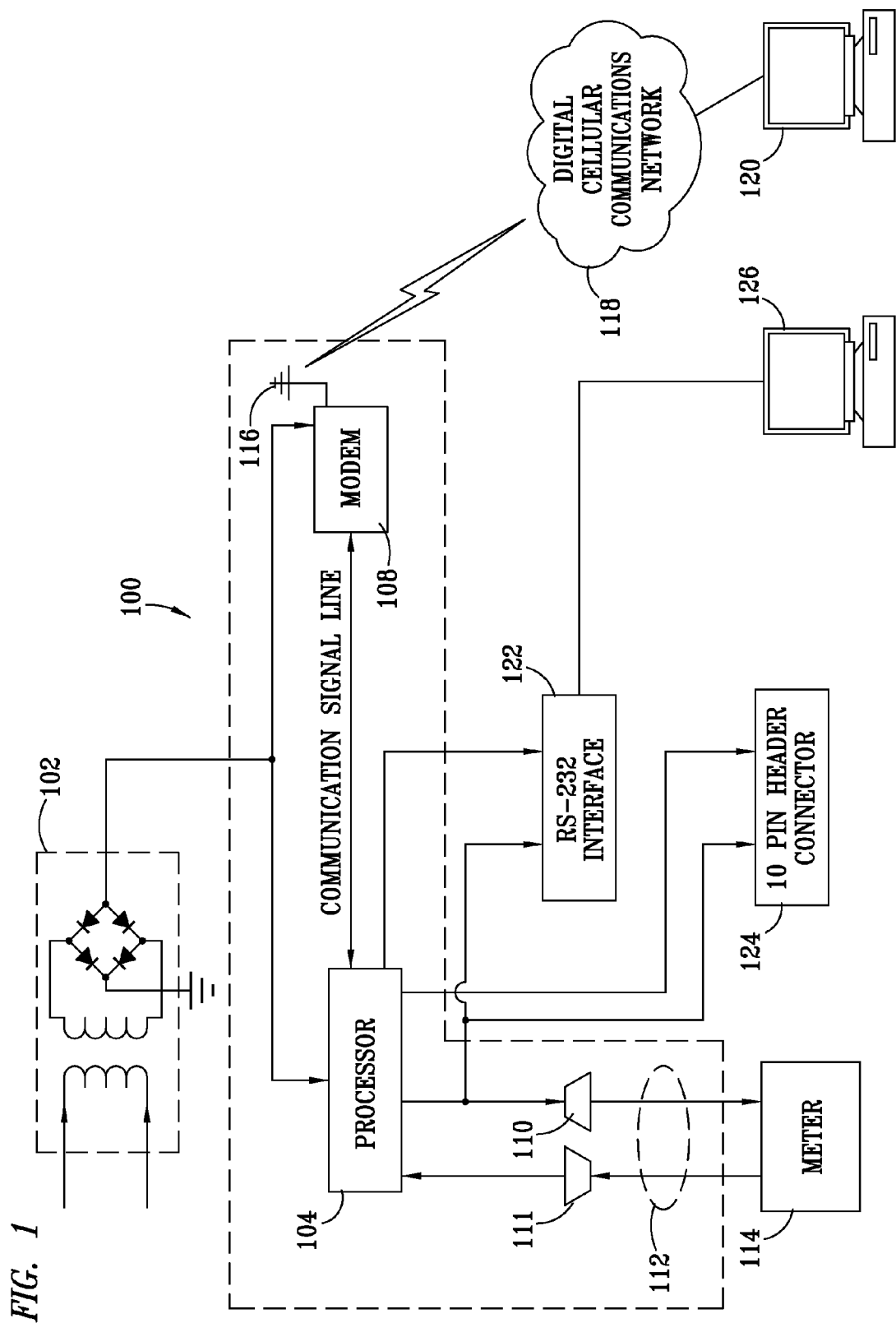
FIG. 1 is a block diagram exemplifying one embodiment of a device embodying features of the present invention for use with CDMA/1×RTT digital cellular radio for a solid state electric meter.

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure in unnecessary detail the drawings of the present invention, or detail has been depicted in the drawings without corresponding detail in the text in order not to obscure in unnecessary detail the written description of the present invention. Additionally, for the most part, details concerning wireless communications and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Referring to FIG. 1 of the drawings, the reference numeral 100 generally designates an apparatus or device embodying features of the present invention for facilitating two-way wireless remote communications for monitoring and receiving data from a meter. As discussed in further detail below, the apparatus 100 includes a processor 104 and a modem 108 and is connectable to a power supply 102 for supplying direct current (DC) power to the processor 104 and modem 108. The processor 104 is preferably connected via optical-isolators 110 and 111 and an interface 112 to a meter 114, such as a solid state electric meter. The processor 104 is also connected to a cellular modem 108 for communicating data between the processor and modem. The modem 108 is connected to an antenna 116 effective for transmitting and receiving radio signals across a CDMA/1×RTT digital wireless cellular radio communications network 118 to a remote control station 120. In a preferred embodiment, an RS-232 communication port 122 and a 10-pin header communication port 124 are also provided for additional functions, such as diagnostic testing and programming of the processor 104, the modem 108, and the meter 114, as discussed in further detail below.

FIGS. 2-6 exemplify, without limitation, details of one preferred embodiment of the components presented above with respect to FIG. 1. It is noted that various connector labels are depicted in FIGS. 2-6 to designate in a conventional manner how various components of the device 100 are interconnected together.

Figure 2:
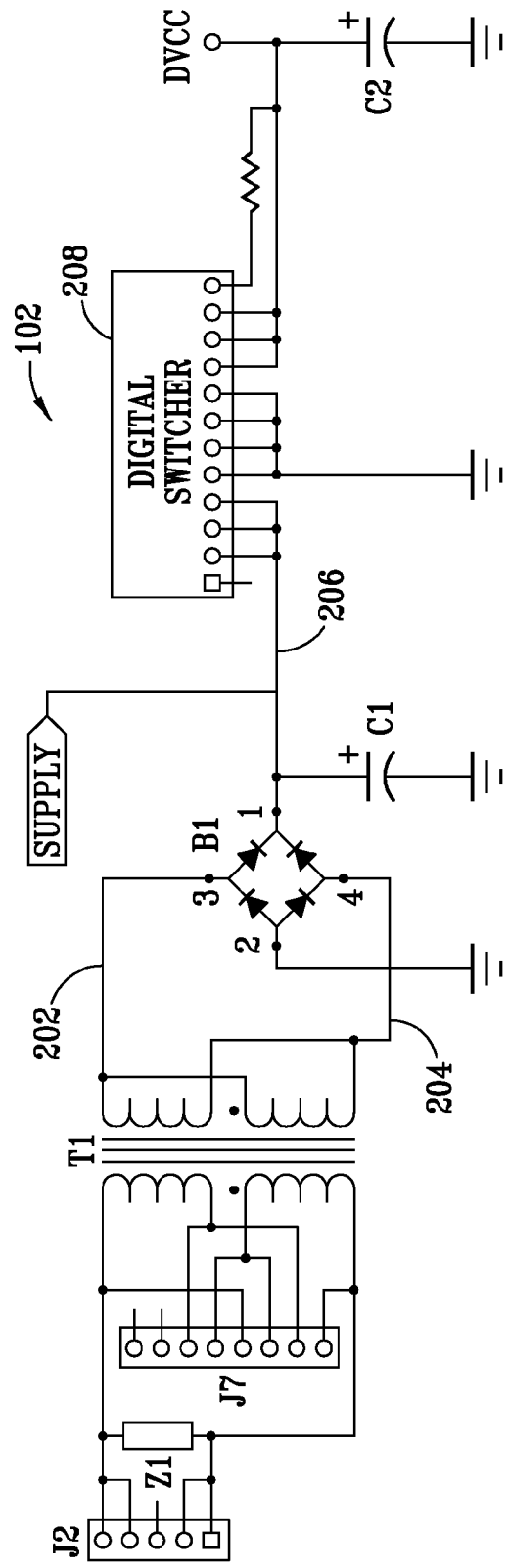
FIG. 2 is a schematic diagram exemplifying one embodiment of a power supply for use with the device of FIG. 1.

Accordingly, FIG. 2 exemplifies a power supply 102, which is preferably an auto-ranging power supply, thereby being effective for receiving a range of primary line voltages, such as a range of about 80 volts of alternating current (VAC) to about 520 VAC, and transforming the line voltage to a direct current (DC), preferably having an output voltage in the range of about 4 to 6 VAC, and preferably about 5 volts DC (VDC) for use by the processor 104 and modem 108 and other components of the device 100.

More specifically, line power preferably having a current of about 2 to 3 amperes is preferably received, via a power connector J2, from an AC power source (not shown) preferably external of the meter 114, such as the power source supplying power to the meter. The power received via the power connector J2 is carried via two wires to a transformer T1. A metal oxide varistor (MOV) Z1, sized to short-circuit at approximately 1100 volts, is preferably connected in parallel on the high side of the transformer T1 for protecting the transformer T1 from power surges. The transformer T1 is preferably a conventional transformer adapted for converting the primary line voltage received from the connector J2 to an output voltage in the range of 4 to 6 VAC, and preferably about 5 VAC. A bridge rectifier B1 is connected to the output of the transformer T1 for converting the AC to DC in a conventional manner for use via a line 206 by the processor 104 and modem 108. Two capacitors C1 and C2, connected to grounds for the lines 204 and 206 respectively, and each rated at about 270 mF and 50 V, are provided to ground AC components of the current that may pass through the bridge rectifier B1. Power is regulated with a switcher 208 connected to the line 206 for conditioning and regulating the power to specific hardware requirements. In an alternative embodiment of the invention, the power supply 102 may comprise a conventional battery (not shown) of suitable capacity, or may be supplemented by a battery. Power supplies are generally considered to be well-known in the art, and therefore will not be described in further detail herein.

Figure 3:
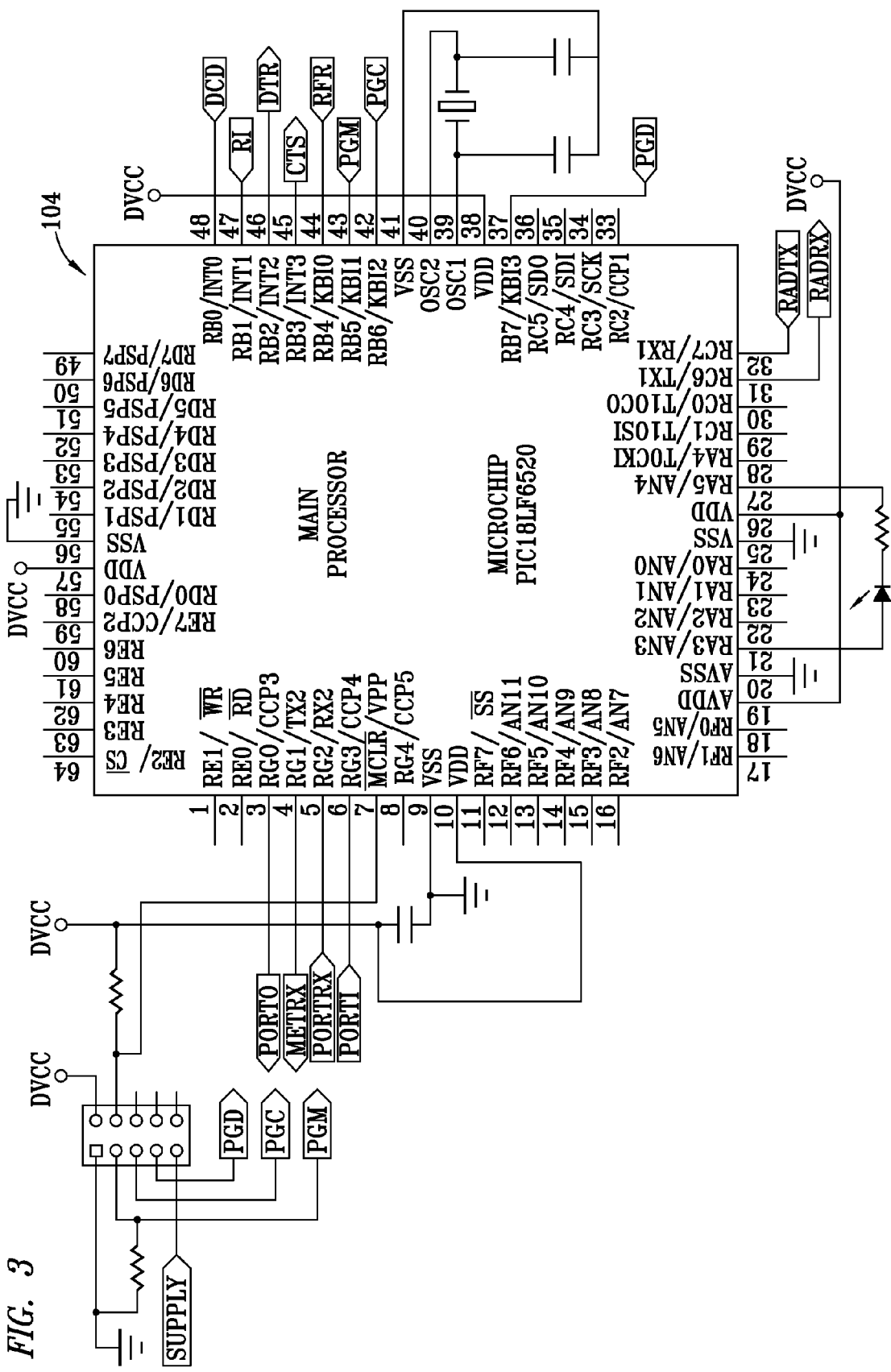
FIG. 3 is a schematic diagram exemplifying one embodiment of a processor for use with the device of FIG. 1.

FIG. 3 exemplifies the processor 104 as a Microchip PIC18LF6520, though any of a number of conventional processor may be utilized, which is effective for buffering about 80 bytes to 256 bytes of data, includes multiple serial ports, such as defined by pins 3-6, 31-32, and 42-48, through which simultaneous communications via multiple Universal Synchronous/Asynchronous Receiver/Transmitters (USARTs) may be effectuated to interface with the modem 108, meter 114, and communication ports 122 and 124, and for executing code to effectuate the logic depicted by flow chart 700, described below with respect to FIG. 7. The processor 104 is preferably operable for executing code written in assembly language. Still further, the processor 104 is preferably configured for enabling the device 100 to redirect packet buffering and voltage levels (i.e., TTL) out to signal processes from the modem 108 and the meter 114 (e.g., buffering the packet from the meter 114 which exceeds the buffering capability of the modem 108). The multiple serial ports of the processor 104 enables the device 100 to perform the above buffering and control different signal processes from the modem 108 to the meter 114. This provides signal processes with flow control and data terminal functions, without causing modem buffers to overflow resulting in a timeout condition and termination of a communication session. Processors such as the processor 104 are considered to be well-documented in publicly available technical literature, and are otherwise considered to be well-known in the art and, therefore, will not be described in further detail herein, except as appropriate to describe the invention.

Figure 4:
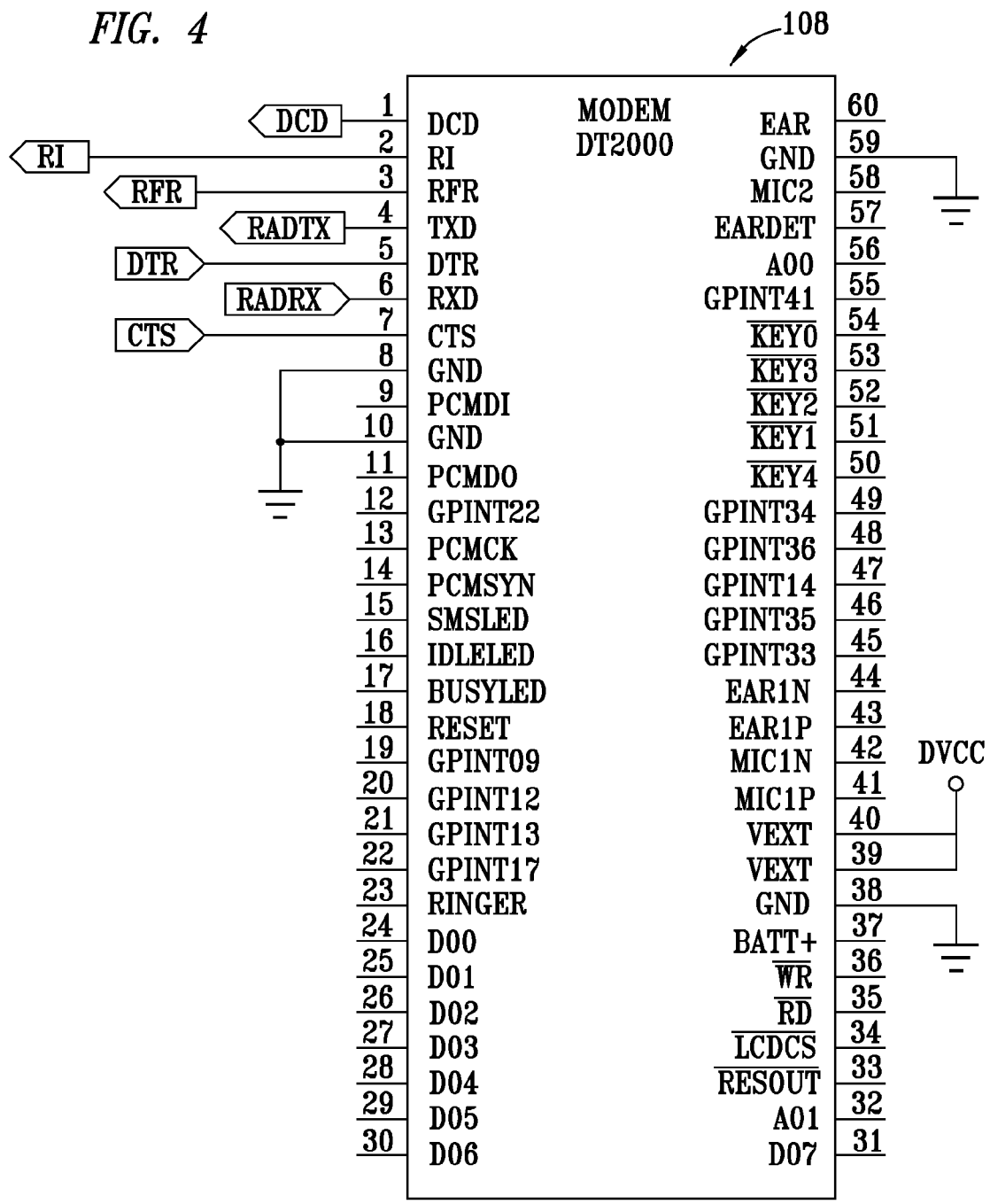
FIG. 4 is a schematic diagram exemplifying one embodiment of a modem for use with the device of FIG. 1.

FIG. 4 exemplifies the cellular modem 108 as though any conventional circuit-switched cellular data modem may be utilized, which is operable in a packet data (i.e., TCP/IP) mode and a circuit switch mode, and which is effective for demodulating CDMA/1×RTT digital cellular communication signals received by the antenna 116 for processing by the processor 104, and for modulating signals received from the processor 104 for transmission as CDMA/1×RTT digital cellular communication signals from the antenna 116, to thereby establish a wireless telephony data connection via the CDMA/1×RTT digital cellular communication network 118 with the remote control station 120. The modem 108 is also preferably operable for receiving incoming data and transmitting outgoing data utilizing a protocol such as IS-95A/B, Dynamic Host Configurable Protocol (DHCP), a static Internet protocol (IP), and the like. Modems such as the modem 108 are considered to be well-documented in publicly available technical literature, and are otherwise considered to be well-known in the art and, therefore, will not be described in further detail herein.

Figure 5:
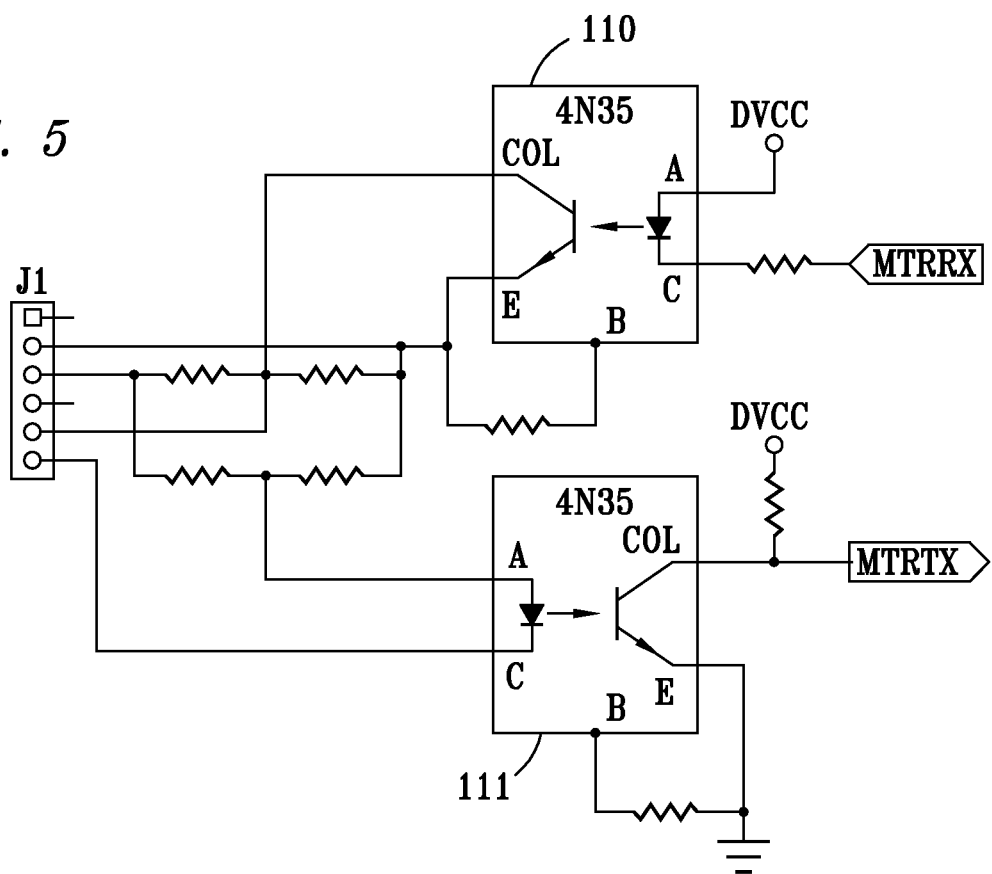
FIG. 5 is a schematic diagram exemplifying one embodiment of optical isolators for use with the device of FIG. 1.

FIG. 5 illustrates the optical isolators 110 and 111, which are effective for electrically isolating the processor 104 from voltage ground planes of the interface 112, and for enabling the modem 108 and antenna 116 to connect to a negative ground. More specifically, the optical isolators 110 and 111 are operable for using a transistor-to-transistor logic (TTL) communication protocol between the processor 104 and the meter 114. It may be appreciated that, together with the interface 112, the optical isolators 110 and 111 facilitate using a TTL communication protocol between the processor 104 and the meter 114. While optical isolators 110 and 111 are depicted in FIG. 5 as being a conventional 4N35, any conventional 6-Pin DIP package phototransistor output optical isolator (also referred to as an optocoupler) may be utilized. Because optical isolators are generally considered to be well-known in the art, the optical isolators 110 and 111 will not be described in further detail herein.

Figure 6:
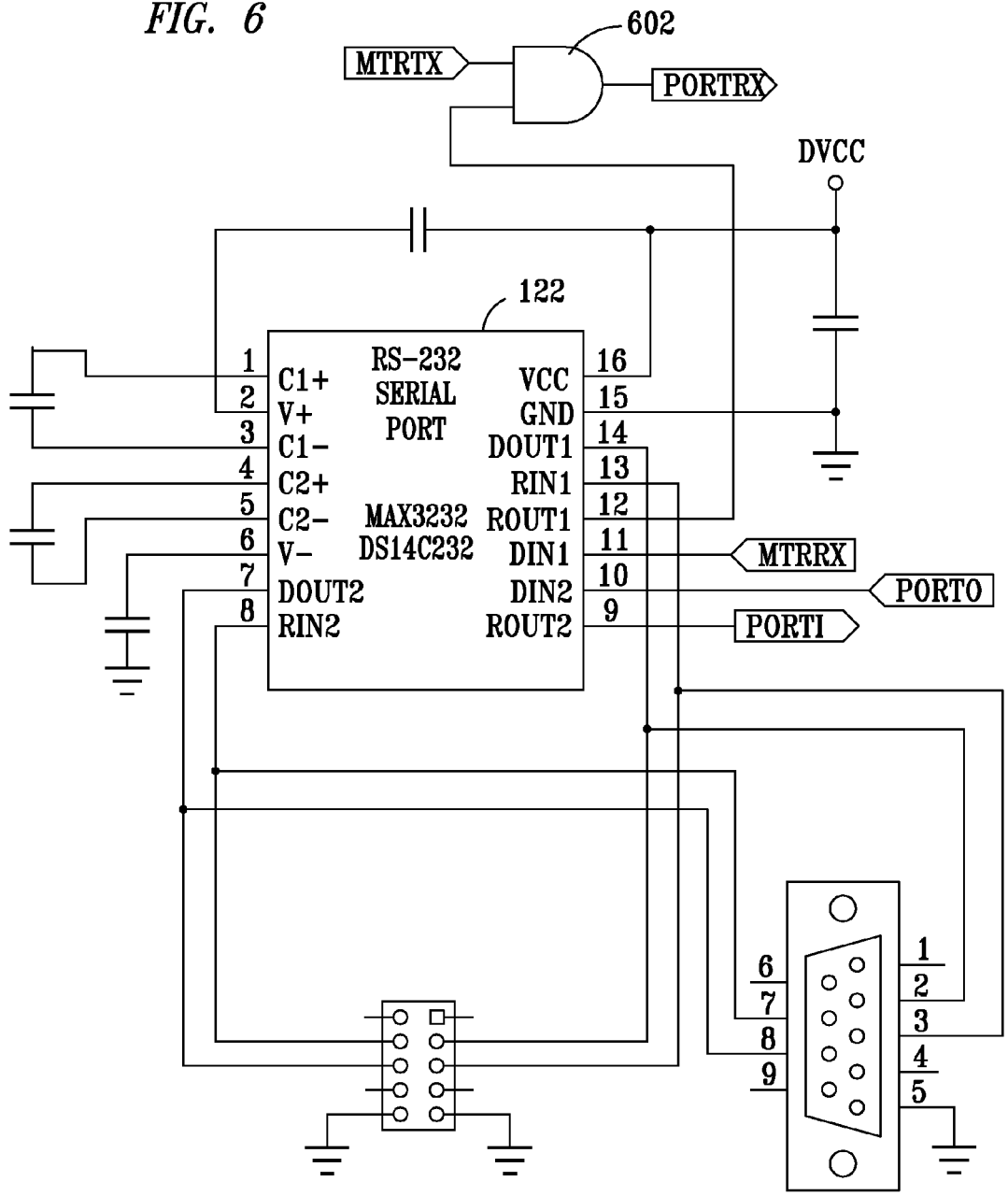
FIG. 6 is a schematic diagram exemplifying one embodiment of an RS-232 serial port for use with the device of FIG. 1.

FIG. 6 illustrates the communications port 122, which is preferably configured as an RS-232 serial port using MAX3232 DS14C232 chip, although any suitable chip may be utilized. The reference numeral 602 designates a regulator utilized in connection with the port 122. Because RS-232 serial ports are generally considered to be well-known in the art, the port 122 will not be described in further detail herein.

It should be appreciated that components, such as the meter 114, or alternatively, with a gas meter, a water meter, an automated teller machine (ATM), a remote terminal unit (RTU) 126, and/or other end point devices, such as, but not limited to, a pump, an electric power regulator, capacitors, relays, operational control reclosure (OCR), and the like, may be connected to either the RS-232 serial port or the interface 112. Furthermore, either the RS-232 serial port or the interface 112 may be utilized to diagnose, program, or retrieve data from, any of the aforementioned components connected to the RS-232 serial port or the interface 112. By way of example, but not limitation, the RS-232 serial port or the interface 112 may be used to facilitate diagnosing the device 100, diagnosing, programming, communicating with, and retrieving data (e.g., billing data) from the meter 114 or other component connected to the RS-232 serial port or the interface 112, programming (e.g., entering a phone number) of the modem 108, determining signal strength and quality of wireless communications, programming of the processor 104, and the like.

Referring back to FIG. 1, the communication port 124 is preferably a 10-pin header connector, which is operable using a TTL communication protocol to facilitate diagnosing and programming the processor 104

The antenna 116 is a conventional antenna, preferably adapted for communicating at two or more digital cellular communication frequencies, or bands. More specifically, the antenna 16 is preferably a tri-band antenna which may be mounted either internally or externally of the meter 114.

The remote control station 120 is an electronic data processor, such as a conventional computer, operable for establishing a telephony data connection via the communications network 118 with the device 100 and meter 114 to retrieve data from the meter, diagnose the meter, or program the meter, or any device connected to the RS-232 serial port 122.

In operation, the device 100 is operable in at least two different modes. In a first mode, the device 100 works in conjunction with conventional solid state electric meters. On the meter 114, the device 100 is preferably installed under the cover of the meter 114 and connects to the meter's communication interface provided on the meter. In a second mode, the device 100 works in conjunction with meters utilizing RS-232 ports, facilitated by the RS-232 port 122.

FIG. 7 is a flow chart of preferred control logic implemented by the processor 104 for retrieving meter data from the meter 114 or other component connected to the RS-232 serial port or the interface 112, in accordance with principles of the present invention. For the purpose of illustration, the flow chart 700 will be described representatively herein with respect to the meter 114 connected via the interface 112 to the processor 104. Accordingly, in step 702, the remote control station 120 generates a request message for meter data, and transmits the request message via the communications network 118 to the device 100. In step 704, the modem 108 of the device 100 receives the request message, also referred to herein as incoming data, via the antenna 116 and forwards the request message to the processor 104. In step 706, the processor 104 buffers the request message and, in step 708, adjusts the baud rate as necessary and forwards the request message, via the interface 112, to the meter 114, and enters into a wait state until receipt of data in step 716, described below. In step 710, the meter 114 receives the request message and, in step 712, the meter 114 retrieves the requested meter data. In step 714, the meter 114 transmits the requested data, via the interface 112, to the processor 104 of the device 100. In step 716, the processor 104 receives the requested data. In step 718, the processor 104 buffers the requested data and, in step 718, adjusts the baud rate as necessary and forwards the requested data to the modem 108, which, in step 720, forwards the requested data, as outgoing data, via the communications network 118, to the remote control station 120. In step 722, the remote control station 120 receives the requested data and, in step 724, processes or stores the requested data in a suitable manner. It is understood that the request message may be a request for meter billing data, diagnostic data, or the like, or the message may instead comprise code for programming the meter 114.

The invention is operable through the two interfaces 112 and 122 to communicate with the meter 114 and modem 108 simultaneously. By way of example, while the modem 108 is interfaced to, and executing a communication session with, the meter 114, a different communication session may also be executed with the modem 108 via an RS-232 communication port interface.

The modem 108 may be configured via the RS-232 port 122. Accordingly, AT commands may be sent via the communication port 122 to the modem 108 while the device 100 is connected to the electric meter 114, i.e., without removing the device 100 from the meter 114. The communication port 122 also allows for other diagnostics to be performed, such as, by way of example, determining modem configuration and signal strength and quality.

The processor 104 may take a standard AT command annunciated from the meter 114 and change it from a telephony command to a TCP-IP connection. By way of example, the meter 114 may send an AT command ATDT2145551212, and the processor 104 may send a control signal back to the meter 114, and issue a TCP-IP call to a static IP address 12-123-123-12 that hosts the necessary software to receive the data call. It may be appreciated that this function allows the device attached to the modem to simulate a telephony circuit call without any special features or firmware update.

Figure 8B:
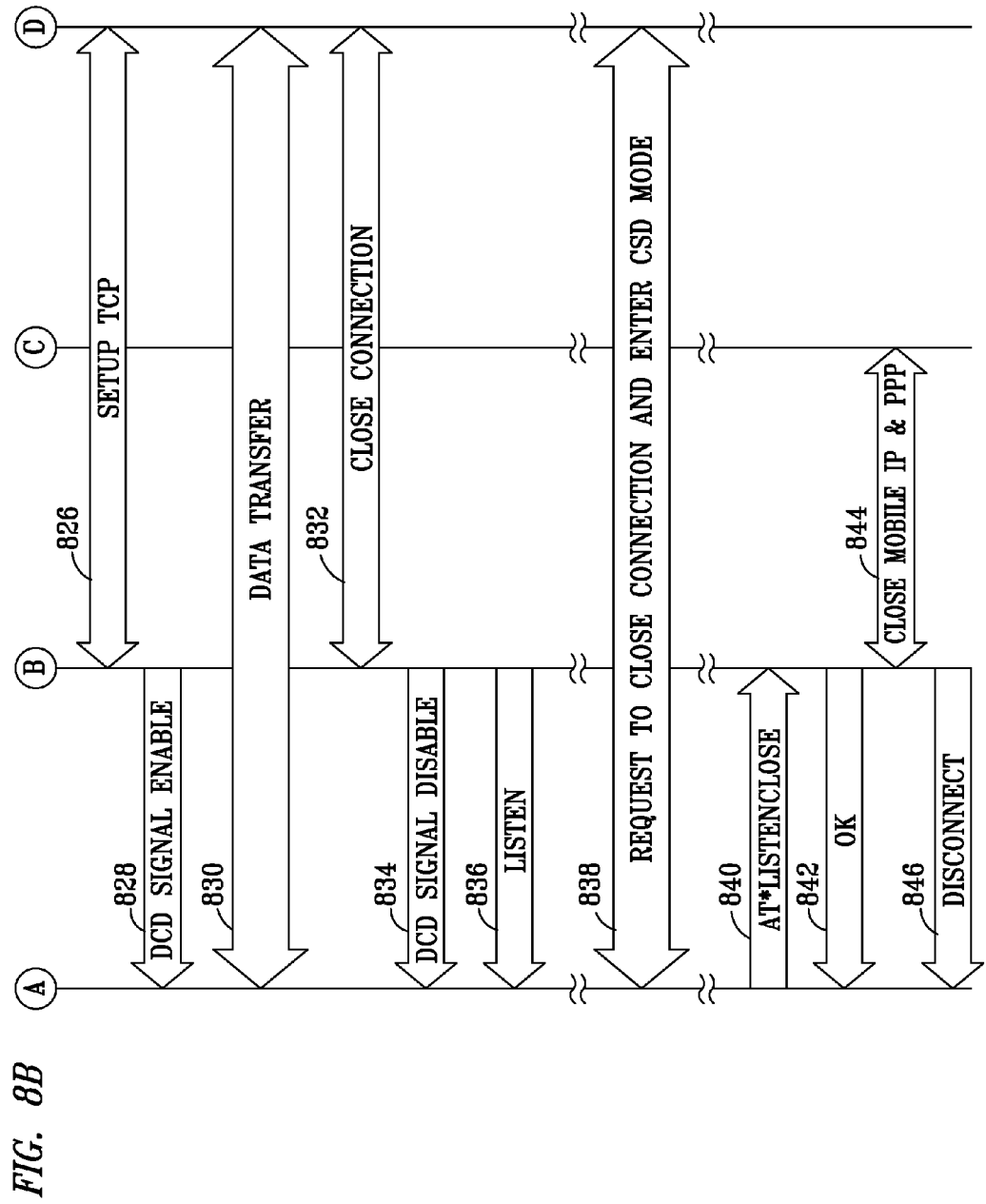

FIGS. 8A-8B depict a flow chart, designated by the reference numeral 800, of preferred control logic for establishing a packet data call from the control station 120, also referred to herein as a remote client, to the processor 104, also referred to herein as a mobile station or server, using AT commands sent from data terminal equipment (DTE), in accordance with principles of the present invention. As discussed above, the processor 104 is connectable to the meter 114. The modem 108 should be aware of its Internet Protocol (IP) address, and preferably checks connections periodically, such as every three hours, to verify the network connections. Further, the modem 108 should reset and reestablish connection in Listen mode after a data call and flush out the buffer.

The modem 108 is assigned a static IP address for server operation so that the remote client can connect using that IP address. The IP address is assigned from network 118 when a Listen session begins. Network 118 preferably comprises a digital cellular communications network, a packet data serving node (PDSN, i.e., a gateway router for packet data between a mobile data application and a packet data network), or the like. For purposes of discussion herein, a PDSN will be used to collectively represent network 118 with respect to the flow chart 800. The modem 108 must know when the IP address been changed by network 118, and the remote server, e.g., processor, 104 must be updated with the address change.

The modem 108 port may be configured by setting the destination Listen port number by using the AT command AT*LISTENPORT=x. If this command has been set previously, the value is queried by using the command AT*LISTENPORT? to make sure that the value is correct.

The Listen Mode may be set by using the AT command AT*LISTENMODE=1. If this command has been set previously, the value should be queried by using the command AT* LISTENMODE? to make sure that the value is correct. This shows that the modem is set to Listen operation and ready for an incoming call. The modem is preferably automatically set for Listen mode when powered on. The following exemplifies the modem being set to the Listen mode.

```
>>>>> Set IP Mode On Port 7700
ATE1
OK
AT*LISTENMODE=1 {Set by user, wherein 1 denotes the IP Mode}
OK
AT*LISTENPORT=7700 {Set by user, modem listening to port}
OK
START AUTO LISTEN {Modem starting Listen mode}
CALL
PPP
LISTEN
AT*LOCALIP?
*LOCALIP: 166.241.6.235
OK
>>>>> Completed.
```

With reference to FIGS. 8A-8B, at step 802, the processor 104 transmits a message to the modem 108 requesting whether the PDSN 118 is available. In response, the modem 108 generates a reply at step 804 including an indicator indicating network availability. By way of example, an indicator value of 0 may indicate that the modem is not in a mobile IP mode and that commands are not supported. An indicator value of 1 may indicate that there is no network and, therefore, that a call may not be made. An indicator value of 2 or 3 may indicate that a call may be made, and an indicator value of 5 may indicate that a private connection may be established.

At step 806, the processor 104 instructs the modem 108 to listen for an inbound data call, and at step 808, the modem 108 replies with an acknowledgment of the instruction received in step 806. At step 810, a traffic channel is opened between the modem 108 and the PDSN 118. At step 812, the modem 108 transmits a call message to the processor 104 communicating that there is a traffic channel open on the PDSN 118. With an open traffic channel, at step 814, a point-to-point protocol (PPP) is set up between the modem 108 and the PDSN 118, and at step 816, a PPP is set up between the modem 108 and the processor 104. As used herein, a PPP is a connection-oriented data link protocol for communication between two terminals. Network layer protocols such as IP can encapsulate packets into PPP frames on an established link.

At step 818, a mobile IP number is set up between the modem 108 and PDSN 118. At step 820, a message is transmitted to the processor 104 to enter into a Listen mode.

At step 822, a request is generated to establish a connection between the modem 108 and the client 120. At step 824, a connection message is generated from the modem 108 to the processor 104. At step 826, transmission control protocol (TCP) is set up between the modem 108 and client 120. At step 828, a message is generated from the modem 108 to the processor 104 to enable the data carrier detect (DCD) signal.

At step 830, data may be transmitted between the processor 104 and the client 120. Upon termination of data transmission, at step 832, the connection between the modem 108 and client 120 is closed. At steps 834 and 836, respectively, a message is generated from the modem 108 to the processor 104 to disable DCD signal and to enter a Listen mode.

At step 838, a request is generated to close the connection between the server processor 104 and the client remote control station 120 and enter into a circuit switch data (CSD, also known as IS-95) mode, or alternatively, a TCP-IP mode. At step 840, the processor 104 generates a message to the modem 108 indicating that the processor 104 is exiting from the Listen mode, and in step 842, the modem 108 generates an acknowledgment that the processor 104 is no longer in the Listen mode. In step 844, the mobile IP and PPP connection between the modem 108 and the PDSN 118 is closed. In step 846, the modem 108 generates a message to the processor 104 to disconnect from the modem 108.

By the use of the present invention and method for facilitating wireless communication and acquisition of meter reading data from conventional solid state electric meters, as well as other types of meters, such as gas meters, water meters, automatic teller machines (ATM's), remote terminal units (RTU), end point devices, and the like.

It is understood that the present invention may take many forms and embodiments. Accordingly, several variations may be made in the foregoing without departing from the spirit or the scope of the invention. For example, the functionality, including buffering, embodied by the processor 104 may be incorporated into the modem 108.

Figure 9:
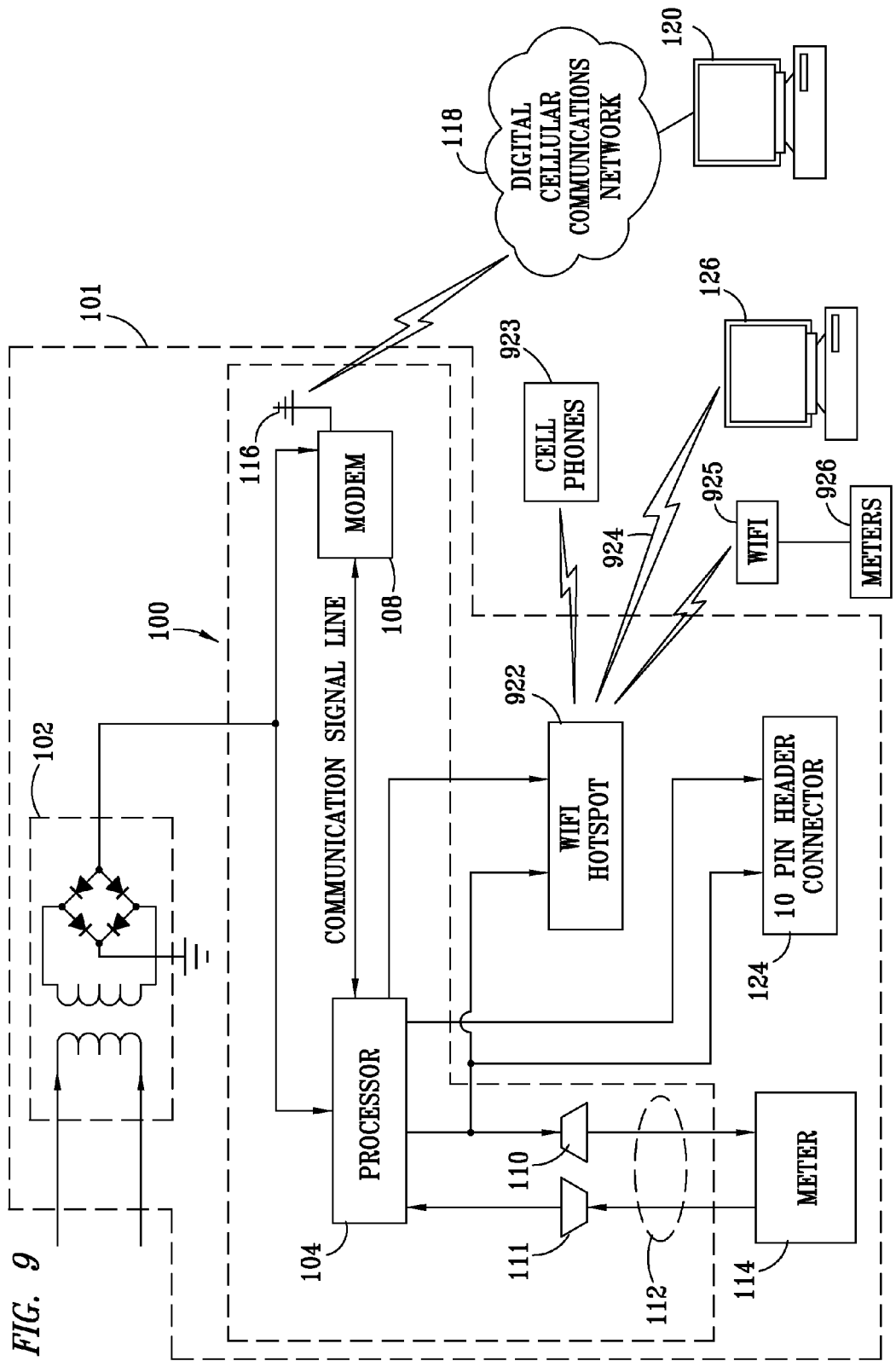
FIG. 9 is a block diagram exemplifying one embodiment of a device embodying features of the present invention for use with WiFi in a solid state electric meter.

FIG. 9 exemplifies an alternate embodiment of the invention in which the RS-232 interface 122 is replaced by a WiFi hotspot 922 housed in the meter box 101. While not shown as such, it is also contemplated that the WiFi hotspot 922 may be used in addition to the RS-232 interface 122. The term "WiFi" is used herein to refer to any wireless local area network (WLAN), typically based on the IEEE 802.11 standards. Wireless services in a home, such as VOIP and digital media, including video and digital television services, may be added via a wireless connection to the WiFi hotspot 922. WiFi hotspots are considered to be well-known to persons having ordinary skill in the art and, therefore, will not be described in further detail herein.

The WiFi hotspot 922 preferably receives electrical power from an always-on connection in the meter box 101, enabling reliable communications through the WiFi hotspot 922, and allowing one or more cell phones 923 proximate to the WiFi hotspot to connect to the network 118 via the meter box 101, instead of each cell phone 923 establishing its own channel to connect to the network 118. Thus, the WiFi hotspot 922 releases and/or reduces the need for multiple channels to connect to the network 118 by using a single channel connecting the modem 108 to the network 118 to establish one channel through which multiple devices (e.g., cell phones 923 and modems 108) connect to the network.

A virtual private network may be built that is self-configuring, allowing multiple WiFi hotspots 922 at multiple meter boxes 101 proximate to one another to talk through a single WiFi hotspot 922 and single cell channel to the network 118. For example, if there are ten meters 926 (including meter 114) in a residential area and all are in close proximity to each other, and each has cellular 923 and/or WiFi 925 functionality, the units can determine their bandwidth and may only use one cell connection to the network 118, and the other nine connect to the one via the WiFi connection, thus sharing the bandwidth of the one cell connection.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A device for monitoring a meter, the device comprising:
    an antenna adapted for receiving via a network incoming data from a client remote control station, and for transmitting via a network outgoing data to the client remote control station;
    a cellular modem coupled to the antenna for establishing a wireless telephony data connection;
    a processor coupled to the modem for receiving and processing incoming data, and for processing and communicating outgoing data to the modem for transmission via the antenna and the network to the client remote control station;
    a communication interface connected to the processor and connectable to the meter for communicating incoming data from the processor to the meter, and for communicating the outgoing data from the meter to the processor; and
    a wireless local area network (WLAN) connected to the processor and modem, the WLAN being configured for communicating signals between the modem and devices configured for at least one of VOIP and digital media;
    program code residing in the modem for:
        receiving a message inquiring whether the network is available;
        generating a reply indicating network availability;
        receiving an instruction to listen for an inbound data call;
        generating an acknowledgment of the instruction received;
        facilitating the opening of a traffic channel between the modem and the network;
        generating a message to the processor indicating that there is a traffic channel open on the network;
        facilitating establishing a point-to-point protocol (PPP) between the modem and the network;
        generating a message to the processor that a PPP is set up between the modem and the network;
        facilitating establishing a mobile IP number between the modem and the network;
        generating a message to the processor to enter into a Listen mode;
        generating a request to establish a connection between the modem and the client remote control station;
        generating a connection message to the processor;
        facilitating establishing a transmission control protocol (TCP) between the modem and client remote control station;
        generating a message to the processor to enable data carrier detect (DCD) signaling;
        facilitating the transmission of data between the processor and the client remote control station;
        closing the connection between the modem and client remote control station;
        generating a message to the processor to disable DCD signaling;
        generating a message to the processor to enter a Listen mode;
        generating a request to close the connection between the processor and the client remote control station and enter into one of a circuit switch data (C SD) mode and a TCP-IP mode;
        receiving from the processor a message indicating that the processor is exiting from the Listen mode;
        generating an acknowledgment that the processor is no longer in the Listen mode;
        facilitating closing of the mobile IP and PPP connection between the modem and the network; and
        generating a message to the processor to disconnect from the modem.

2. The device of claim 1, wherein the communication interface is a serial communication interface.

3. The device of claim 1, wherein the communication interface is operable utilizing a transistor-to-transistor logic (TTL) communication protocol.

4. The device of claim 1, wherein the communication interface further comprises an optical-isolation circuit effective for electrically isolating the device from the meter.

5. The device of claim 1, wherein the processor further comprises two or more communication ports and Universal Synchronous/Asynchronous Receiver/Transmitters (USARTs) operable for simultaneous communications with two or more components.

6. The device of claim 1, wherein the antenna is configured for being mounted within the meter.

7. The device of claim 1, wherein the antenna is configured for being mounted externally of the meter.

8. The device of claim 1, wherein the modem is a circuit-switched modem.

9. The device of claim 1, wherein the device is configured for being mounted within the meter.

10. The device of claim 1, wherein the modem is operable for receiving incoming data and transmitting outgoing data utilizing a protocol comprising one of IS-95A/B, Dynamic Host Configurable Protocol (DHCP), and a static Internet protocol (IP).

11. The device of claim 1, further comprising a serial communications port connected to the processor for facilitating diagnostics of the device, diagnostics of the meter, diagnostics of a remote terminal unit (RTU), programming of the meter, programming of the modem, programming of the processor, communications with other end point devices.

12. The device of claim 1, further comprising a TTL port connected to the processor for facilitating diagnostics and programming of the processor and the modem.

13. The device of claim 1, wherein the meter is at least one of an electric meter, a gas meter, a water meter, an automated teller machine (ATM), a remote terminal unit (RTU), and an endpoint device comprising at least one of a pump, an electric power regulator, capacitors, relays, an operational control reclosure (OCR), a device which may be monitored via a communications interface, a device requiring changes, and a device requiring a status update.

14. The device of claim 1, wherein the network is a packet data serving node (PDSN).

15. The device of claim 1, wherein the network is a digital wireless cellular communications network.

16. The device of claim 1, wherein the at least one of the plurality of other communication devices comprises at least one cellular phone.

* * * * *